(12) United States Patent
Segal

(10) Patent No.: US 11,421,628 B2
(45) Date of Patent: Aug. 23, 2022

(54) FUEL INJECTOR FOR HYPERSONIC JET ENGINE OPERATION

(71) Applicant: UNIVERSITY OF FLORIDA RESEARCH FOUNDATION, INC., Gainesville, FL (US)

(72) Inventor: Corin Segal, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 17/268,542

(22) PCT Filed: Sep. 4, 2019

(86) PCT No.: PCT/US2019/049514
§ 371 (c)(1),
(2) Date: Feb. 15, 2021

(87) PCT Pub. No.: WO2020/123000
PCT Pub. Date: Jun. 18, 2020

(65) Prior Publication Data
US 2021/0239321 A1    Aug. 5, 2021

Related U.S. Application Data

(60) Provisional application No. 62/730,070, filed on Sep. 12, 2018.

(51) Int. Cl.
*F02K 7/10*    (2006.01)
*F02K 7/14*    (2006.01)
(Continued)

(52) U.S. Cl.
CPC ............... *F02K 7/10* (2013.01); *F02K 7/14* (2013.01); *F23R 3/20* (2013.01); *F02K 7/00* (2013.01)

(58) Field of Classification Search
CPC ..... F23R 3/20; F02K 7/00; F02K 7/08; F02K 7/10; F02K 7/14; F05D 2220/10; F05D 2220/80; F05D 2300/514
See application file for complete search history.

(56) References Cited

U.S. PATENT DOCUMENTS 2,667,741 A     2/1954  Price
3,699,773 A *  10/1972  Schuning ................. F23R 3/28
                                                 261/DIG. 39
(Continued)

FOREIGN PATENT DOCUMENTS

CN        104633709 A     5/2015
DE      102011000383 A1   8/2012
(Continued)

OTHER PUBLICATIONS

International Searching Authority, International Search Report and Written Opinion for International Application No. PCT/US2019/049514, Jun. 19, 2020, (12 pages), European Patent Office, Rijswijk, Netherlands.

*Primary Examiner* — William H Rodriguez
(74) *Attorney, Agent, or Firm* — Alston & Bird LLP

(57) ABSTRACT

Provided herein is a fuel injector capable of providing fuel into a jet engine operating at hypersonic speeds. Embodiments may include a system for fuel injection for an engine traveling at supersonic speeds. The system may include a fuel injection strut extending between opposing walls of an inlet to the engine, and a porous surface extending across at least a portion of the fuel injection strut. The fuel may be introduced into the inlet of the engine through the porous surface of the fuel injection strut. The porous surface of the fuel injection strut may extend along a fuel injecting portion of the fuel injection strut spaced a predefined distance from the opposing walls of the inlet. The porous portion of the (Continued)

fuel injection strut may include a porosity of about 100 pores per square inch or lower porosities as dictated by the specific design considerations.

18 Claims, 6 Drawing Sheets

(51) Int. Cl.
 *F23R 3/20* (2006.01)
 *F02K 7/00* (2006.01)

(56) References Cited

U.S. PATENT DOCUMENTS

| | | | | |
|---|---|---|---|---|
| 3,727,409 | A * | 4/1973 | Kelley | F23R 3/20 60/768 |
| 3,811,280 | A | 5/1974 | Wharton et al. | |
| 5,214,914 | A * | 6/1993 | Billig | F23R 3/20 137/15.1 |
| 5,396,761 | A * | 3/1995 | Woltmann | F23R 3/20 60/749 |
| 5,660,040 | A * | 8/1997 | Henry | F23R 3/20 60/768 |
| 5,727,382 | A * | 3/1998 | Chevalier | F02K 7/10 60/768 |
| 5,865,025 | A * | 2/1999 | Peres | F02K 7/10 60/768 |
| 5,899,061 | A * | 5/1999 | Bouchez | F02K 7/10 60/768 |
| 5,941,064 | A * | 8/1999 | Chevalier | F23R 3/20 60/768 |
| 6,164,061 | A * | 12/2000 | Chevalier | F23R 3/28 60/767 |
| 2007/0071733 | A1 * | 3/2007 | Kandel | A61L 27/3852 435/325 |
| 2007/0141375 | A1 * | 6/2007 | Budinger | B23K 1/0056 428/548 |
| 2009/0205311 | A1 * | 8/2009 | Bulman | F42B 15/10 60/251 |
| 2014/0216054 | A1 * | 8/2014 | Ostebee | F02C 3/14 60/796 |
| 2015/0292743 | A1 * | 10/2015 | Mook | F23R 3/286 29/889.22 |
| 2016/0003156 | A1 * | 1/2016 | Hanson | F02C 7/24 239/584 |
| 2016/0290291 | A1 * | 10/2016 | Prociw | F23R 3/283 |
| 2016/0348913 | A1 * | 12/2016 | Ott | F02C 7/222 |
| 2017/0159938 | A1 * | 6/2017 | Barnhart | F02C 7/232 |

FOREIGN PATENT DOCUMENTS

| | | |
|---|---|---|
| EP | 0846920 A1 | 6/1998 |
| JP | 05180073 A * | 7/1993 |
| JP | 05272411 A * | 10/1993 |

* cited by examiner

FUEL INJECTOR FOR HYPERSONIC JET ENGINE OPERATION

CROSS-REFERENCE TO RELATED APPLICATIONS

This application is a National Stage Entry of PCT Application Serial No. PCT/US2019/049514, filed on Sep. 4, 2019, which claims priority to U.S. Provisional Patent Application Ser. No. 62/730,070, filed on Sep. 12, 2018, the contents of each of which are incorporated herein by reference.

FIELD OF INVENTION

The present disclosure relates to a fuel injector capable of providing fuel to an airflow into a jet engine operating at hypersonic speeds.

BACKGROUND

Fuel injection is a complex science relying on the proper amount of fuel injected into an intake airflow into a combustion engine or directly into the engine itself. The volume of fuel, the atomization of fuel, and the flow rate of fuel must track with the operational conditions of the engine and the airflow into the engine. As many engines are implemented in mobile vehicles, such as aircraft, the intake air conditions vary greatly from a static condition on the ground to altitudes sometimes exceeding 80,000 feet. Further, the speed and acceleration at which the vehicle travels are a critical factors in establishing the appropriate amount of fuel to inject for proper combustion.

SUMMARY

An objective of this present disclosure is to provide a fuel injection system capable of providing an appropriate volume of fuel in an appropriate mixture with an intake air flow for combustion in an engine, and particularly to a fuel injection system capable of providing this functionality at hypersonic air speeds. Embodiments may include a system for fuel injection for an engine traveling at supersonic speeds. The system may include a fuel injection strut extending between opposing walls of an inlet to the engine, and a porous surface extending across at least a portion of the fuel injection strut. The fuel may be introduced into the inlet of the engine through the porous surface of the fuel injection strut. The porous surface of the fuel injection strut may extend along a fuel injecting portion of the fuel injection strut spaced a predefined distance from the opposing walls of the inlet. The porous portion of the fuel injection strut may include a porosity of about 100 pores per square inch or lower porosities as dictated by the specific design considerations.

The fuel injection strut of some embodiments may include a diamond shaped cross section in a direction substantially parallel to the opposing walls of the inlet of the engine. The diamond shaped cross section may include a leading vertex between two leading faces of the fuel injecting strut, where the leading vertex is upstream of any portion of the fuel injection strut relative to airflow to the engine. The diamond shaped cross section may include a trailing vertex between two trailing faces of the fuel injecting strut, where the trailing vertex is downstream of any portion of the fuel injection strut relative to airflow to the engine. The leading vertex may define an angle between the two leading faces of between about five degrees and about ten degrees. The trailing vertex may define an angle between about forty-five degrees and about seventy-five degrees. The fuel injection strut may be formed of Inconel metal. The leading and trailing edge angles of the diamond shaped cross-section, hence the aspect ratio of the cross-section, can vary depending upon the design specifications. Fuel injection may be from all four surfaces or only from the leading or trailing surfaces of the diamond-shaped injector depending on design specifications. Further, distribution of fuel injection between the leading and trailing surfaces may change during the flight as required by mission considerations. Finally, a set of diamond-shaped injectors of the same or different cross-sections may be installed in an engine cross-section depending on the internal geometry of the engine.

These figures and embodiments herein are meant to illustrate and further describe the present disclosure, however these are not intended to limit any aspect of the device.

BRIEF DESCRIPTION OF THE DRAWINGS

Some embodiments of this present disclosure may be further understood by the detailed descriptions and corresponding figures.

DETAILED DESCRIPTION

Figure 1:
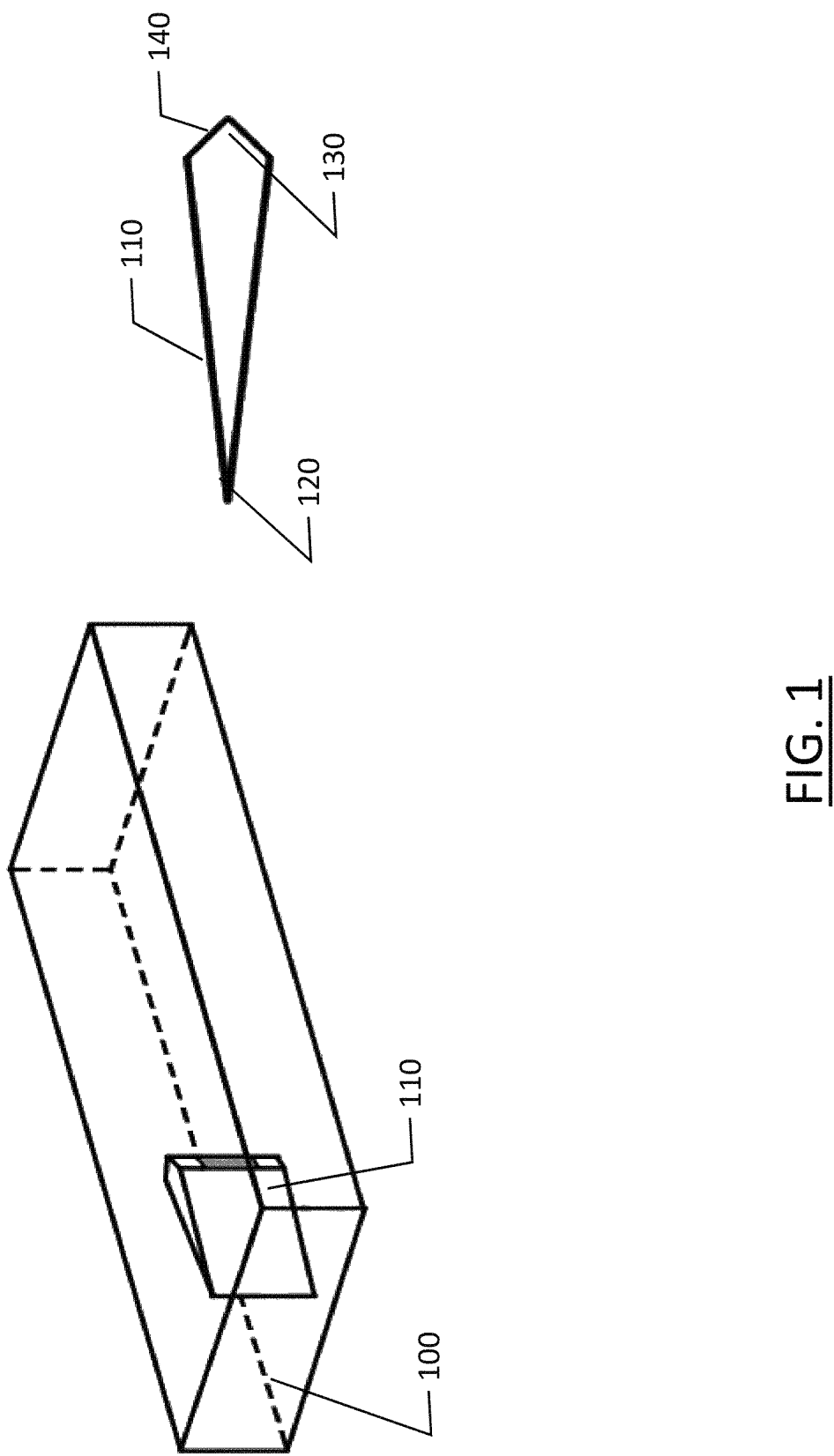
FIG. 1 illustrates an inlet or isolator including a fuel injecting strut along with a plan view of a fuel injecting strut according to an example embodiment of the present disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Fuel injection of an engine during hypersonic flight is a complex issue due to the multitude of variables affecting the inlet airstream and the fuel/air consumption of the engine that is used, whether it is a ramjet, scramjet, turbojet, etc. Further, properly mixing the fuel with the exceedingly large volumes of air entering the engine is difficult, particularly when the engine is relatively closely coupled to the intake and the mixing region for mixing the fuel and the air is short and the air traverses the mixing region in fractions of a second during a fluid residence time within the intake. Embodiments described herein provide a fuel injection system that is capable of fuel injection for an engine in hypersonic flight.

The fluid residence time within a hypersonic engine such as a scramjet of reasonable length is on the order of milliseconds, thus the mixing processes are a determinant factor in the complex ensemble of physical processes that ultimately lead to heat release and thrust generation. Mixing mechanisms for scramjet flow fields may include simple diffusion, mixing of parallel streams of different velocities, densities and chemical composition and bulk mixing resulting from non-parallel streamlines that is accompanied by large vertical structures and considerable momentum exchange. Among the potential solutions, injection of fuel upstream of the combustion chamber, in the inlet or the isolator, may provide advantages including increased mixing length, improved fuel distribution over the entire flight envelope, and better energy management over the entire flow path. Provided herein is a method, system, and apparatus for upstream injection using porous injectors to enhance fuel distribution and to achieve improved premixed conditions at the combustion chamber entrance.

Fuel injection in transonic speed (Mach 0.8 to Mach 1.2, or about 600 to 900 miles per hour), supersonic (Mach>1.0, above 767 mph), and hypersonic speed (generally above Mach 5 or more than 4,000 mph) is often done through a fuel injector within a raised ramp on an inside wall of an intake, protruding into the intake airflow. Due to the location of injection, fuel mixing may be incomplete and may result in too much fuel or too little fuel being introduced into the air flow.

To increase the fuel residence time, thus to achieve a higher degree of mixing of fuel and air upstream of and entering the combustion chamber, fuel may be injected upstream of the combustion chamber in the isolator, in the inlet, or even further upstream in the vehicle forebody. Fuel injection in the inlet is less problematic than injection in the forebody as injection can be tailored to keep the fuel out of the boundary layer within the inlet thus reducing the danger of flashback when the boundary layer ignites. Embodiments described herein may decrease the mixing length between fuel and air by as much as half for the typical ramjet with a design Mach number of around 6. The fuel mixing with the inlet airflow and the additional processes that may be present if liquid fuels are used (e.g., jet break-up and vaporization) may lead both to degradation or improvement of the inlet starting and operational characteristics depending upon the fuel type, fuel flow rate, and the flight conditions. Thus, a number of practical issues arise in the case of pre-injection of liquid fuel in the inlet duct. These may include balancing mixing efficiency, flow deceleration, and inlet performance, and the ability to avoid flashback by eliminating the residence of the fuel in the boundary layers formed along the inlet/isolator walls.

Embodiments described herein may implement pylons or struts in the intake that protrude into the flow and facilitate fuel distribution far from the walls in spatial uniformity with the core airflow. Using through-pylon injection solutions may generate pressure losses and impose cooling requirements. Thin pylons that reduce the deficiencies that accompany the presence of the struts may be used to inject fuel a short distance downstream of the pylon. These pylons create a region of low pressure that has the effect of lifting the fuel from the walls of the intake and thus avoiding the introduction of fuel in the boundary layer which may risk flashback.

According to embodiments of the present disclosure, fuel distribution from pylons in the inlet of a hypersonic vehicle may be performed by porous injector struts. The distribution of fuel from these porous injectors significantly improves the fuel distribution at the injection location and considerable breakup is achieved rapidly upon injection when liquid fuels are used. Further, injection via a porous strut may eliminate the difficult problems of strut cooling by taking advantage of both internal and external surface film evaporative cooling. Embodiments produce a large degree of premixed fuel region proximate the entrance to the combustion chamber that may provide substantial improvements to downstream combustion efficiency.

An example embodiment as described herein is illustrated in FIG. 1 which depicts a isolator 100 and strut 110 combination. The size of the duct shown herein used for modeling of the fuel mixing is one inch high and four inches across. The illustrated strut 110 is of a diamond shape and may include a leading edge angle 120 of eight degrees, for example, and a trailing edge angle 130 of 60 degrees. Fuel injection of the modeled embodiment is from the downstream faces 140 to simplify analysis owing to the configuration symmetry. Fuel injection in this computation may be performed on half of the duct in the flow direction to simplify the analysis owing to the configuration symmetry.

In an example implementation modeled herein to demonstrate the advantages of the present disclosure, the Mach number at the entrance to the duct was 2.2. The porous wall was simulated by adjusting the discharge pressure to distribute the fuel injection over the entire surface to generate an overall injection equivalence ratio of 1. The modeled geometry included half of the isolator duct in an axial direction, where the domain dimensions are one inch by two inches and having a length of 8.5 inches. The strut 110 is disposed at the center of the test section, 0.5 inches from the entrance to the geometry. The strut of the modeled embodiment was two inches long and 0.125 inches wide at the widest point, with a leading angle of between 5 degrees and 10 degrees, such as 8 degrees and a trailing angle of between about 45 degrees and 75 degrees, such as 60 degrees as shown in FIG. 1. The front wall was modeled at a constant temperature of 80.33 degrees Fahrenheit due to the selected porous material having a thin wall thickness and the core being subject to a constant flow of injectant supplied from a constant source. Fuel injection from the strut is from the middle half-inch portion of the height within the duct, avoiding fuel injection into the boundary layer. This resulted in a total injection area of 0.249 inches square at the rear of the strut, with a porosity of 100 pores per square inch. Fuel injection parameters including the overall equivalence ratio, material porosity, distribution of fuel injection on the frontal and rear faces, and geometry are parameters that will necessarily be varied for individual configuration optimization.

Figure 2:
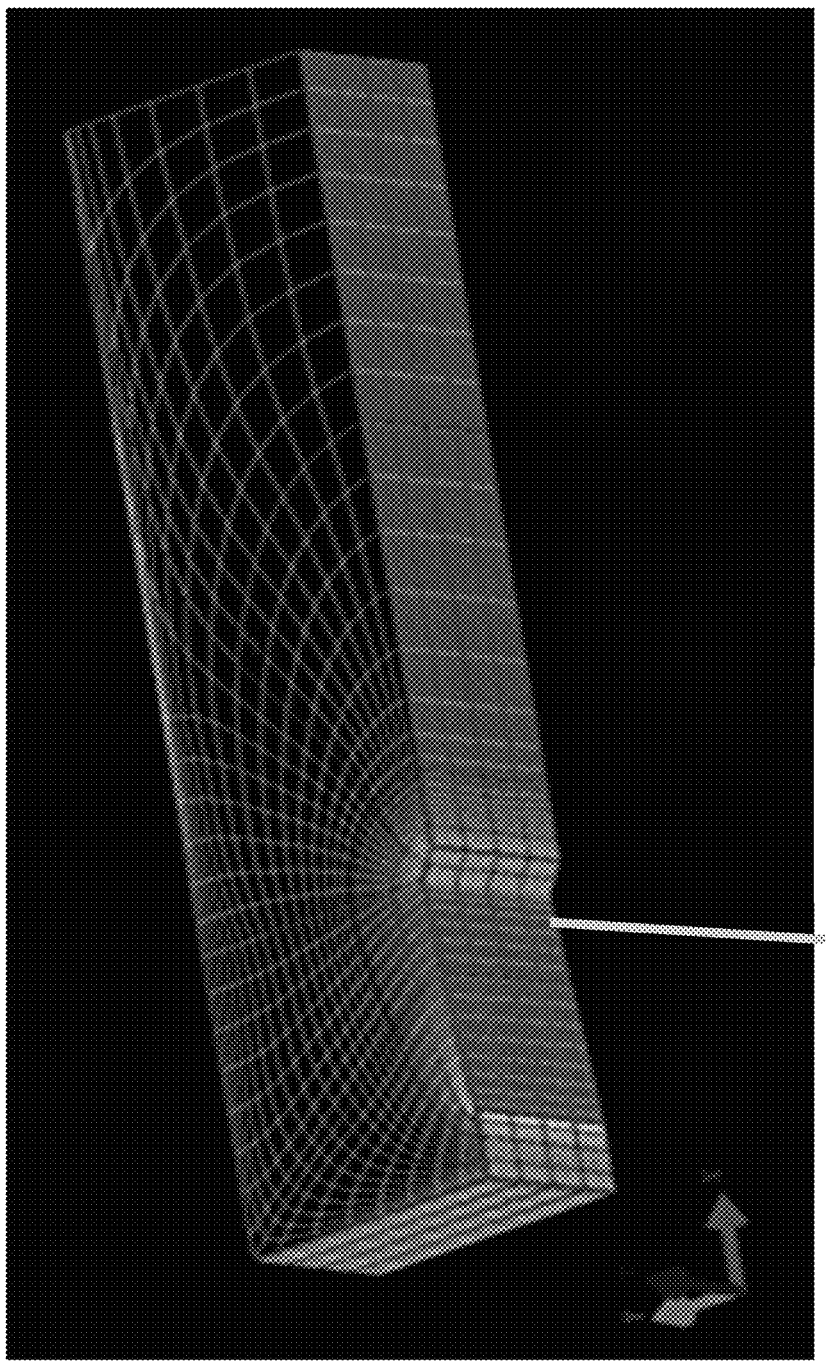
FIG. 2 illustrates a grid of a half domain of the geometry of the inlet and the fuel injecting strut according to an example embodiment of the present disclosure.

The computational solver used to model the example embodiment described herein was VULCAN, a CFD software package for turbulent reacting and non-reacting flows developed at NASA for conditions ranging from subsonic to hypersonic speeds. The three-dimensional case described herein has been solved on the structured multi-block grid systems shown in FIG. 2. Turbulence has been modeled here with a k-omega model. FIG. 2 illustrates a grid of a half domain of the geometry. The illustrated grid is relatively course except in the region near the strut for efficiency of computational effort. The illustrated grid resulted in over 100,000 elements total with the majority located within a half inch of the strut 110.

The model included incoming air with a stagnation temperature of 1160° F. and a stagnation pressure of 70 psia (pounds per square inch atmospheric) traveling at Mach 2.2. This related to a static temperature of 364° F. and a static pressure of 6.55 psia. These conditions were chosen for duplication in an experimental facility for ground testing.

Figure 3:
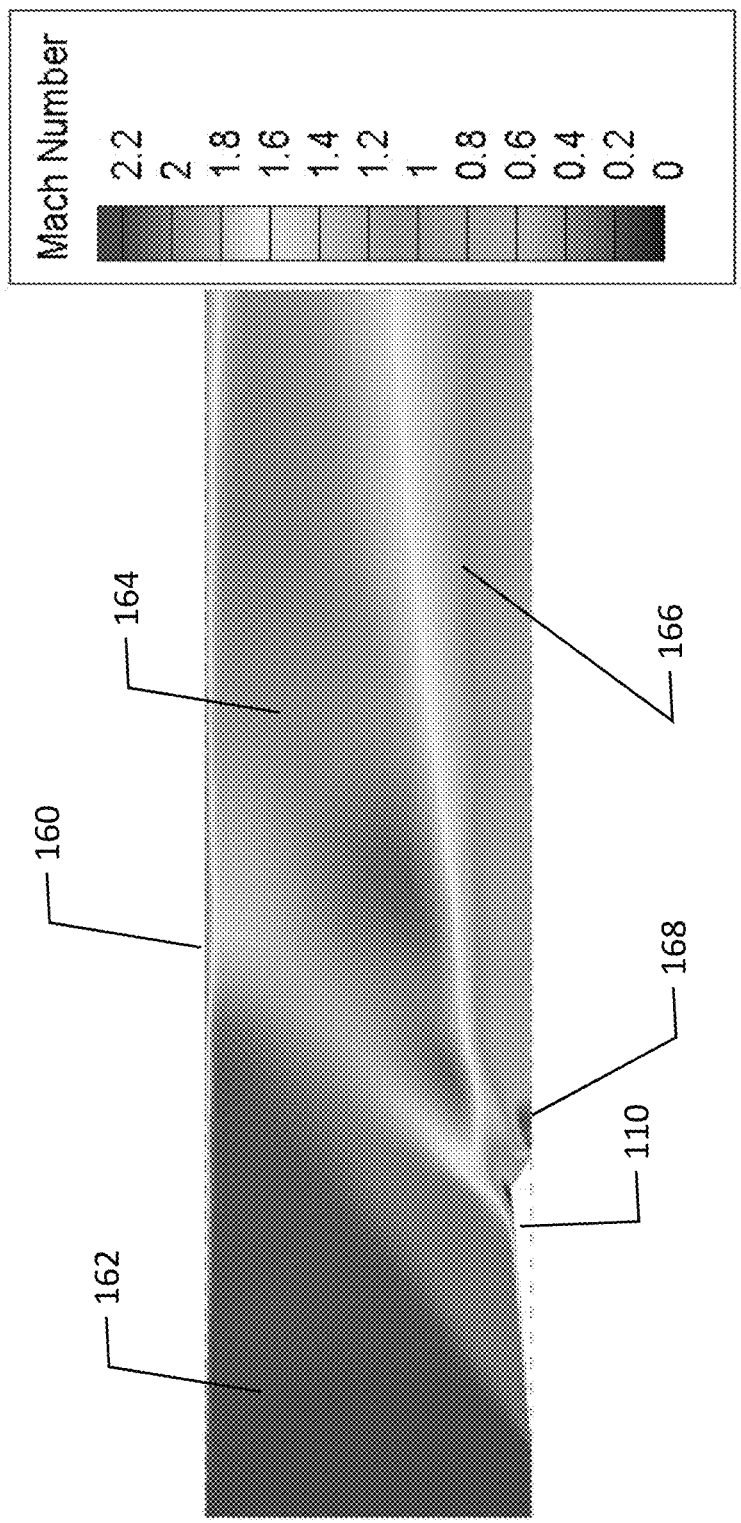
FIG. 3 depicts the Mach number distribution in the spread plane, y-x, of the inlet around the fuel injecting strut according to an example embodiment of the present disclosure.
Figure 4:
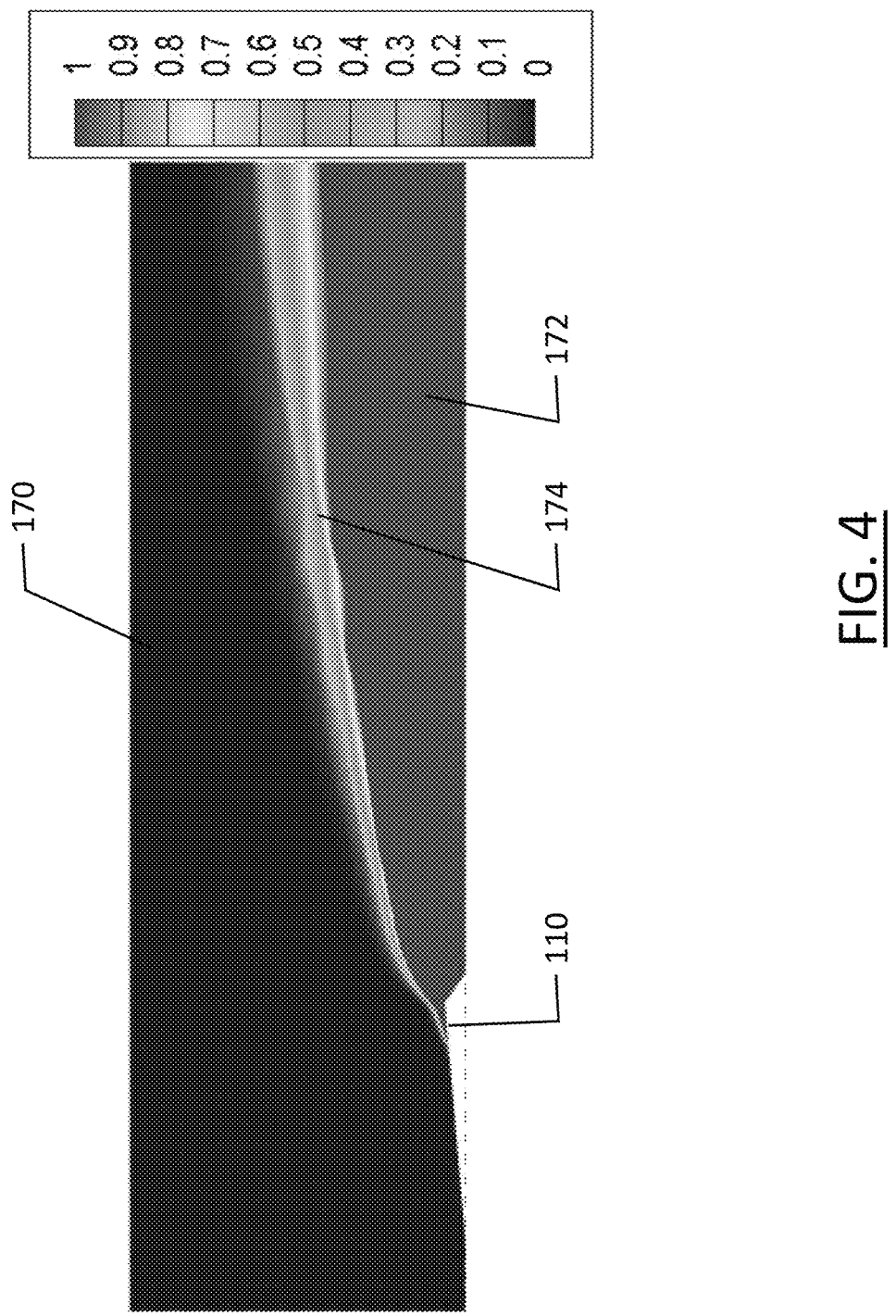
FIG. 4 illustrates the equivalence ratio limited to 1.0 of the air/fuel mixture within the inlet/isolator emanating from the fuel injecting strut in the x-y plane according to an example embodiment of the present invention.

FIG. 3 illustrates the effects of fuel injection on the Mach number distribution in the spreading plane. Following the relatively weak shock generated at the leading edge of the strut injection on the trailing face reduces the otherwise expected expansion. A small region of separated flow can be seen at the shock interaction with the wall boundary layer 160 where the Mach number is reduced from the 2.2+ region of 162 to a Mach number of 1.0 or less. This region may be larger in practice. In the modeled embodiment, the injection is sufficiently strong in terms of mass flow that separation of the flow occurs at expansion. As shown in FIG. 3, the air flow has a Mach number of 2.2 or higher in the leading region 162, and decreases to around a Mach number of 1.8 in region 164, while the flow behind the strut 110 has a region 166 of around Mach number 1.2 or less, while there are small stall regions around the strut 110 at 168. Penetration of a certain amount of injected fuel may occur upstream of the injection location as reflected in FIG. 4, which shows that the corresponding equivalence ratio in the spreading plane downstream of the strut 110 injector. The region 170 has an equivalence ratio of zero, while the region 172 has an equivalence ratio of one or more, with a small region of gradient 174 between the two major regions. The figures indicate substantial spreading of the injectant (fuel) yet a significant concentration remains close to the duct centerline.

Figure 5:
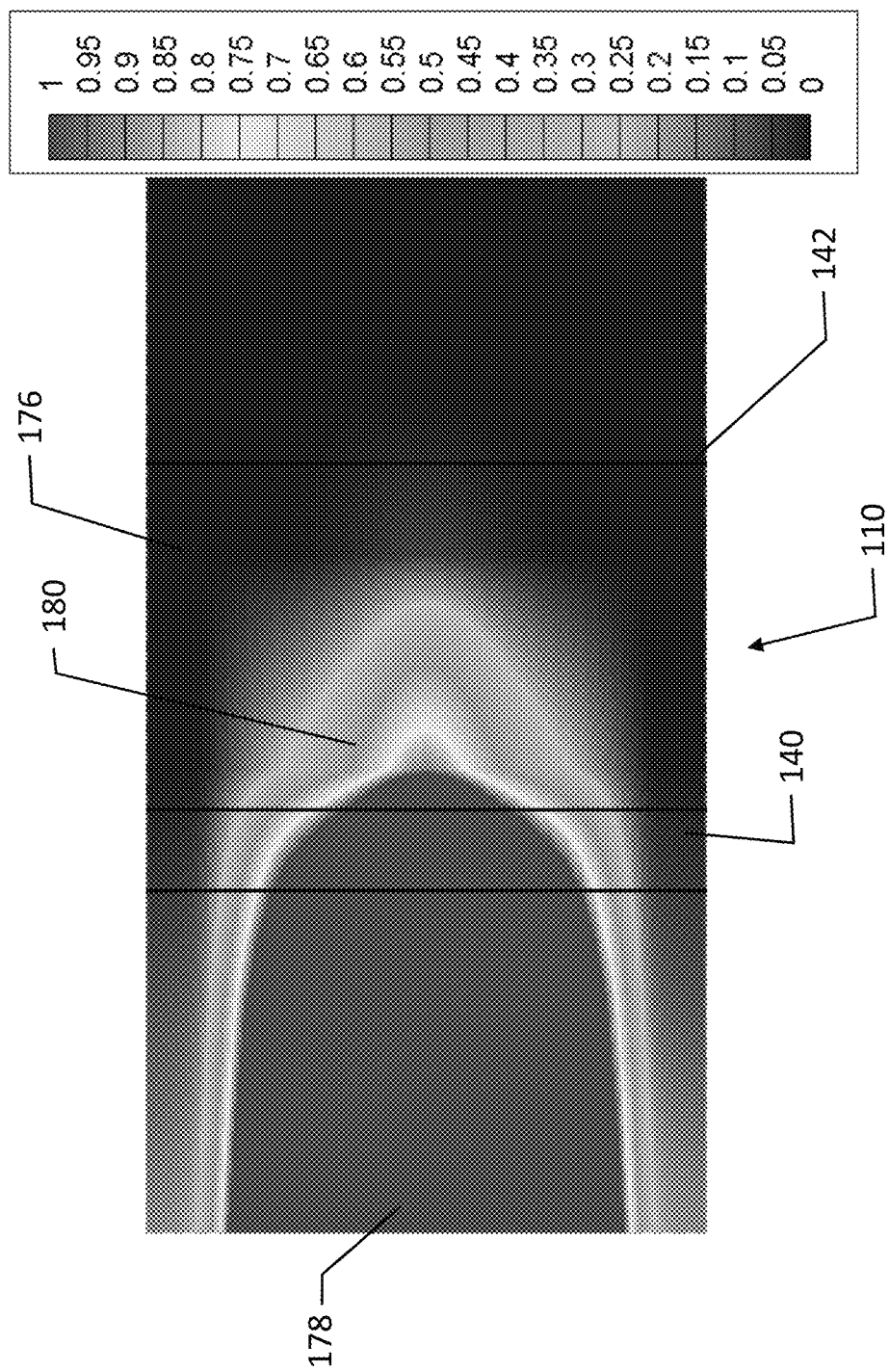
FIG. 5 illustrates the equivalence ratio limited to 1.0 of the air/fuel mixture within the inlet/isolator emanating from the fuel injecting strut in the z-y plane according to an example embodiment of the present invention.

FIG. 5 illustrates the equivalence ratio in the penetration plane, viewing the strut 110 from the side and the downstream face 140 from which the fuel is injected relative to the leading edge 142 of the strut 110. As shown, substantial spreading of the injectant occurs in region 178 with the equivalence ratio of one or more, yet a significant concentration of fuel remains close to the duct centerline. The region 176 upstream of the downstream face 140 has an equivalence ration of zero, while a small transition area 180 exists between the two regions. The figure further shows that small amounts of fuel reach the upper and lower walls despite maintaining the region of no-injection close to the walls.

As demonstrated, a new method of upstream injection makes use of porous injectors to enhance fuel distribution and to achieve close to premixed conditions to the combustion chamber entrance. The modeled embodiment with a simplified grid serves as a preliminary tool to guide application-specific calculation of injector dimensions and inlet conditions. Embodiments described herein provide a broad distribution of fuel across an entire cross-section area at the isolator/combustion chamber interface with potential to generate a quasi-premixed condition over a large area of the cross-section. Embodiments may be beneficial for practical systems in expanded flame holding domains though additional advantages exist for the flow path design.

Figure 6:
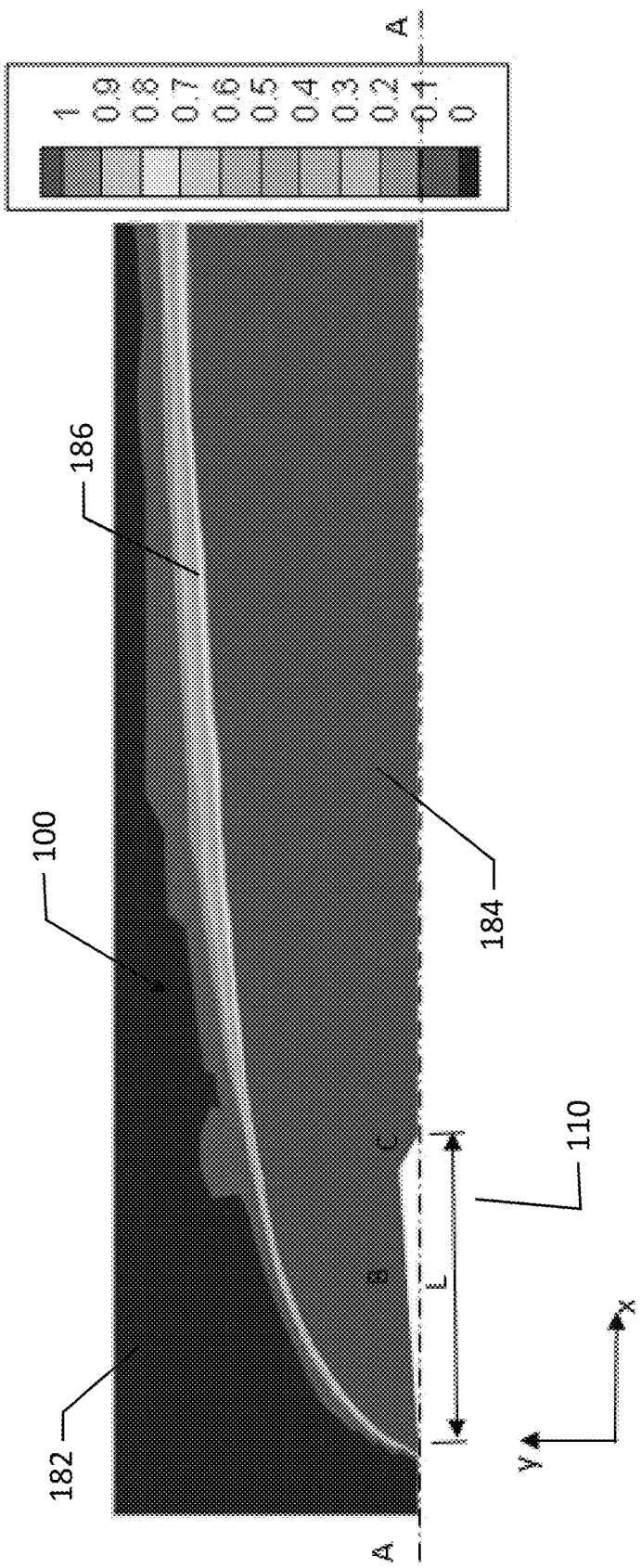
FIG. 6 depicts the equivalence ratio limited to 1.0 of the air/fuel mixture within the inlet/isolator emanating from a fuel injecting strut of indeterminate dimensions in the x-y plane according to an example embodiment of the present invention.

FIG. 6 illustrates an example embodiment of an inlet 100 including an injector strut 110 disposed therein. As shown, the dimensions of the strut are variable based on the application, where faces B and C of the symmetrical diamond-shaped strut with overall length L can be varied to achieve ideal premixed conditions of fuel at the entrance to the combustion chamber. The region 182 has an equivalence ratio of about zero, while the region 184 has an equivalence ratio of about one or more, with a small transition region 186 between the two. Other variables may include the porosity of the injector as defined by the number of pores per unit area. Mass flow injection may be from both faces B and C which may be optimized independently of one other from zero mass flow to the maximum mass flow required for a particular application. Further, inlets and isolators with a wide aspect ratio, multiple fuel injection struts may be used to provide fuel mixing across the width of the inlet or isolator to achieve a quasi-uniform premixed condition at the exit of the isolator as the air/fuel mixture enters the combustion chamber.

Embodiments described herein may be used in a variety of inlet/isolator configurations with designed air speeds ranging across the supersonic spectrum into the hypersonic realm. The fuel used may be liquid or gaseous, and may include hydrogen fuel, hydrocarbon fuel, or the like.

The material used for the injector struts may include a variety of materials suitable for use under the load and temperature conditions of supersonic and hypersonic flight and may include Inconel metals which are oxidation and corrosion resistant.

Any modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system for fuel injection for an engine traveling at supersonic speeds comprising:
    a fuel injection strut extending between opposing walls of an inlet to the engine, wherein the fuel injection strut comprises a leading vertex between two leading faces, and a trailing vertex between two trailing faces; and
    a porous surface extending across at least a portion of the two leading faces and the two trailing faces of the fuel injection strut, wherein fuel is introduced into the inlet of the engine through the porous surface of the two leading faces and the two trailing faces of the fuel injection strut.

2. The system of claim 1, wherein the porous surface of the fuel injection strut extends along a fuel injecting portion of the fuel injection strut spaced a predefined distance from the opposing walls of the inlet.

3. The system of claim 2, wherein the porous surface of the fuel injection strut comprises a porosity of about 100 pores per square inch.

4. The system of claim 1, wherein the fuel injection strut comprises a diamond shaped cross section having a major axis in a direction substantially parallel to the opposing walls of the inlet of the engine.

5. The system of claim 4, wherein the leading vertex of the diamond shaped cross section is upstream of any portion of the fuel injection strut relative to airflow to the engine.

6. The system of claim 5, wherein the trailing vertex of the diamond shaped cross section is downstream of any portion of the fuel injection strut relative to airflow to the engine.

7. The system of claim 6, wherein the leading vertex defines an angle between the two leading faces of between about 5 to 10 degrees.

8. The system of claim 7, wherein the trailing vertex defines an angle between about 45 degrees and 75 degrees.

9. The system of claim 1, wherein the fuel injection strut is formed of Inconel metal.

10. The system of claim 1, wherein the fuel injection strut is formed, at least in part, of a porous portion.

11. A combustion chamber for a hypersonic aircraft comprising:
an inlet comprising opposing walls; and
a fuel injection strut extending between the opposing walls of the inlet, wherein the fuel injection strut defines a hollow core bounded by walls and defining four faces, wherein a first pair of faces are directed toward an intake of the combustion chamber and a second pair of faces are directed toward an exhaust of the combustion chamber, wherein the core receives a flow of fuel from a fuel source, and wherein the fuel flows from the core through each of the four faces of the strut into the combustion chamber.

12. The combustion chamber of claim 11, wherein fuel is injected from the fuel injection strut into the combustion chamber through the four faces of the strut along a portion of the strut spaced from each of the opposing walls.

13. The combustion chamber of claim 11, wherein the first pair of faces are arranged to form a leading angle of between five degrees and ten degrees.

14. The combustion chamber of claim 13, wherein the second pair of faces are arranged to form a trailing angle of between forty-five and seventy-five degrees.

15. A fuel injector for a hypersonic aircraft comprising:
a body defining four faces, each of the four faces comprising a porous portion along at least a portion of a length of each of the four faces, wherein the four faces comprise a leading pair of faces and a trailing pair of faces, wherein the leading pair of faces meet at an angle of between five degrees and ten degrees, wherein the trailing pair of faces meet at an angle of between forty-five degrees and seventy-five degrees.

16. The fuel injector of claim 15, wherein the leading pair of faces meet at a leading edge and the trailing pair of faces meet at a trailing edge, wherein the fuel injector is symmetrical about a plane defined through the leading edge and the trailing edge.

17. The fuel injector of claim 16, wherein the core receives a supply of fuel, and wherein the fuel is injected into a combustion chamber of the hypersonic aircraft through each of the four faces.

18. The fuel injector of claim 15, wherein where the four faces each define a wall, and wherein a core is defined and bounded by the four faces.

\* \* \* \* \*